United States Patent [19]

Dockerty, deceased et al.

[11] 4,052,189
[45] Oct. 4, 1977

[54] APPARATUS FOR INHIBITING CHECKS AND CRACKS IN THE MOIL OR YOKE AREA OF TV FUNNELS

[75] Inventors: Stuart M. Dockerty, deceased, late of Corning, N.Y.; by Robert C. Dockerty, executor, Poughkeepsie, N.Y.

[73] Assignee: Corning Glass Works, Corning, N.Y.

[21] Appl. No.: 711,730

[22] Filed: Aug. 5, 1976

[51] Int. Cl.² .................. C03B 11/12; C03B 9/38; C03B 11/06
[52] U.S. Cl. .................................. 65/319; 65/356; 65/362; 65/68
[58] Field of Search .............. 65/302, 68, 356, 362, 65/319, 305

[56] References Cited

U.S. PATENT DOCUMENTS

| | | | |
|---|---|---|---|
| 2,853,834 | 9/1958 | Vincent | 65/302 X |
| 3,078,696 | 2/1963 | Torok | 65/356 |
| 3,132,018 | 5/1964 | Prendergast et al. | 65/302 |
| 3,148,047 | 9/1964 | Torok | 65/362 X |
| 3,282,671 | 11/1966 | Lanker | 65/362 X |
| 3,573,025 | 3/1971 | Hamilton | 65/319 X |
| 3,595,637 | 7/1971 | Eldred et al. | 65/362 X |
| 3,660,067 | 5/1972 | Townsend, Jr. et al. | 65/302 |
| 3,997,318 | 12/1976 | Takatoki et al. | 65/319 X |

Primary Examiner—S. Leon Bashore
Assistant Examiner—Frank W. Miga
Attorney, Agent, or Firm—Burton R. Turner; Clarence R. Patty, Jr.

[57] ABSTRACT

In the hot forming of TV funnels from molten glass, heat is extracted from the glass in the moil area at a lesser rate than that in adjacent areas by providing relatively thin mold portions in such area and thereby producing more fluid glass which may be formed with lower pressing forces. Further, by reducing the wall thickness of the nose portion of a pressing plunger, internal cooling may be applied to such nose portion during the pressing cycle to cool such nose portion and contract it away from the moil area, and thereby prevent the formation of checks and cracks during plunger withdrawal.

5 Claims, 1 Drawing Figure

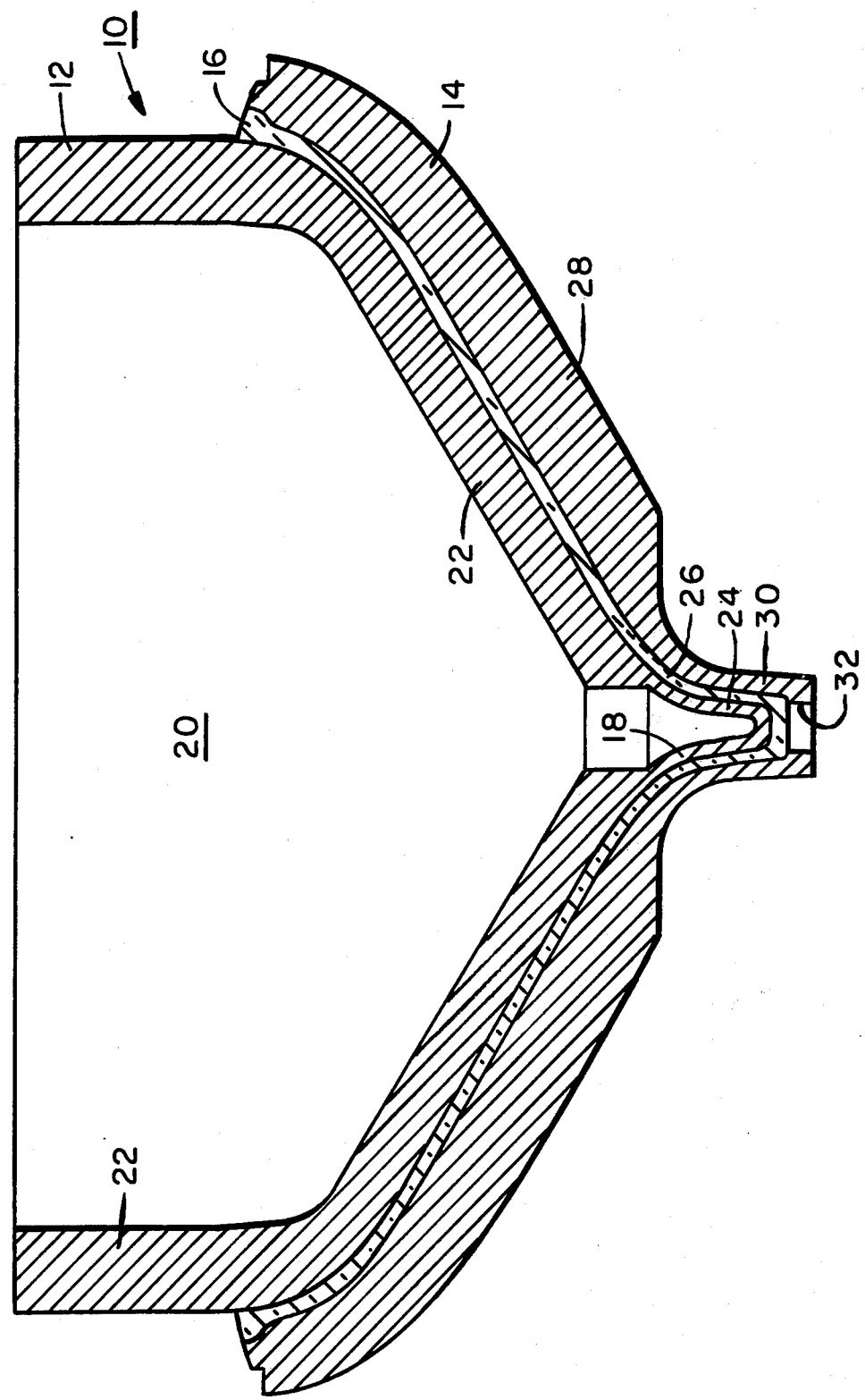

APPARATUS FOR INHIBITING CHECKS AND CRACKS IN THE MOIL OR YOKE AREA OF TV FUNNELS

BACKGROUND OF THE INVENTION

This invention pertains to the art of manufacturing TV funnels from molten glass, and more particularly to method and apparatus for inhibiting the formation of cracks or checks in the moil or yoke area of such funnels during the manufacturing process. In the hot forming of TV funnels from molten glass, the yoke or moil area adjacent the narrow relatively thin-walled neck portion of the funnel has a tendency to crack or check, during formation due to high compressive forces exerted by a plunger on relatively cool and viscous glass in such area, and during the withdrawal of the plunger due to mechanical abrading in the yoke area occasioned by plunger shifting during its withdrawal.

In the past it has been common practice to either press-form or spin-form TV funnels in glass molds having substantially uniform wall thicknesses along their entire extent. In addition, when press-forming such funnels, the plunger, although hollow for cooling purposes, normally had substantially uniform wall thicknesses comprising the entire plunger body.

U.S. Pat. No. 3,536,466 is representative of the prior art mold and plunger apparatus for forming funnel shaped articles, wherein the mold and plunger both have relatively thick or heavy wall portions of uniform wall thickness. Further, the patent illustrates the relatively large mass of metal concentrated about the yoke area of the funnel, which due to the fact that the glass is relatively thin in such area and due to the relatively high thermal conductivity inherent in metals, drastically cools the thin-walled glass in the yoke or moil area. In a like manner, U.S. Pat. No. 3,666,434 illustrates a conventional mold for spin-forming funnel shapes wherein the mold, although provided with cooling fins has substantially uniform relatively heavy wall portions along its extent. In addition, a relatively heavy knockout pin is shown which contributes to the loss of glass temperature in the moil area due to cooling by thermal conduction through the relatively heavy mold mass in such area.

When utilizing the uniform relatively thick-walled molding equipment of the prior art, the mass and high thermal conductivity of such walls absorbed much of the heat from the gob of molten glass delivered to the lower central or yoke area of the mold, particularly in view of the long residence time in which the glass is in contact with the yoke area. Due to the fact that the gob loses heat rapidly to the mold and a skin of cooled glass is formed adjacent the yoke area, larger pressing forces are required to flow the glass into conformity with the mold and form the desired article. Further, as the glass becomes chilled due to the extraction of heat therefrom, pressing forces cause the rather viscous and brittle glass to crack, particularly in the cooled moil area, which cracks deleteriously affect the strength and useability of the finished product. Further, as pressing forces increase, the tendency for the plunger to shift laterally is increased, which sidewise movement has a tendency to cause checks or cracks upon withdrawal of the plunger.

After forming the article it is necessary to cool the mold, and plunger when press forming, prior to removal of the finished article, and the relatively uniform thick-walled molding apparatus of the prior art requires substantial cooling time compared with the plunger and mold of the present invention. Further, the thick walls of the nose portion of the plunger prevented any useful contraction thereof during cooling for facilitating plunger withdrawal, whereas the relatively heavy yoke portion of the mold with a cooled exterior surface prevented useful expansion of such mold portion away from the glass for facilitating ware removal.

SUMMARY OF THE INVENTION

In its simplest form, the present invention is directed to molding apparatus for forming funnel-shaped articles and a method of forming such articles from molten glass, and more particularly to such method and apparatus for inhibiting the formation of checks and cracks in the yoke area of the funnel-shaped article as it is being manufactured.

In an endeavor to reduce or eliminate checks and cracks in the moil or yoke area of funnel-shaped articles formed from glass, the amount of heat withdrawn from the molten glass supplied to such area is materially reduced so as to maintain the molten glass in a fluid state for ease of forming. That is, the formation of such cracks or checks in the moil area is inhibited by reducing the wall thickness of the forming plunger and/or mold in the yoke area to produce higher metal temperatures in such areas adjacent the molten glass, which results in higher glass temperature and better glass flow, thus reducing the tendency to produce cracks or checks during pressing. Further, the thin-walled portions of the forming members ae more responsive to thermal control, thus permitting the nose portion of the plunger to be cooled and contracted away from the moil or yoke area of the newly formed funnel prior to withdrawal of the plunger, thus reducing the probability of creating checks and cracks upon withdrawal.

It thus has been an object of the present invention to provide novel mold and plunger construction which facilitates the retention of heat within molten glass adjacent the moil or yoke area of a funnel-shaped article formed thereby.

A further object of the present invention has been to provide a novel method of reducing the amount of heat extracted from molten glass within a defined area of an article to be formed so as to facilitate the flow of such glass during forming and inhibit the formation of checks and cracks occasioned upon the press-forming of viscous glass.

BRIEF DESCRIPTION OF THE DRAWING

The FIGURE is an elevational view in section of a mold and plunger embodying the present invention for forming a funnel-shaped article from molten glass.

BRIEF DESCRIPTION OF THE PREFERRED EMBODIMENTS

Referring now to the drawing, mold apparatus 10 is shown comprising a plunger 12 and a female mold 14 for forming a funnel-shaped object 16 for use in forming a bulb of a cathode ray tube such as used in TV. The plunger 12 may, with the exception of its nose portion 18, be of conventional construction, with a hollow interior 20 for cooling purposes which is bounded by fairly heavy or thick uniform wall portions 22. The nose portion 18, however, is provided with relatively thin wall portions 24 adjacent the yoke or moil area 26 of the funnel-shaped article 16. In a like manner, the wall portions 28 of the mold 14 are materially reduced in thickness at its lower central portion to provide relatively thin-walled portions 30 adjacent the yoke and moil area 26 of the funnel-shaped article 16.

Whereas the thickness of the wall portions 22 of plunger 12 may be in the neighborhood of about ¾ inch to one inch, the thickness of the thin-walled portions 24 may be only about ¼ inch. Likewise, whereas the thickness of the wall portions 28 of the mold 14 may vary from about 1 ¼ inch to about 1 ¾ inch, the thin wall portions 30 may have a thickness of only about ¼ inch. The thin wall portions, provided by reducing the thickness of the plunger and mold walls adjacent the moil and yoke area, produce higher metal temperatures in such area resulting in higher glass temperature and lower viscosity which facilitates ease of pressing. Preferably the thickness of the thin-walled portions is less than ½ of the thickness of the adjacent or remaining wall portions. Further, by air cooling the nose portion of the plunger midway in the pressing cycle, the thin-walled nose portions 24 are permitted to shrink and contract away from the newly formed article 16, thus allowing plunger withdrawal with virtually no or minimal abrading surface contact in the critical moil or yoke area. Finally, the thin wall portions 30 of the mold permit such areas to expand away from the glass thereby decreasing pressure on the newly formed article as the glass is set-up.

It will be apparent that the particular wall dimensions of the plunger and mold may be varied over relatively broad ranges depending upon the size and shape of the funnel-like article being formed. Should the nose portion of the plunger or moil area of the mold be formed with a thickness much less than ¼ inch, such thin wall portions of the plunger and mold would, through repeated usage, become too hot, resulting in possible glass sticking or distortion. Also, sufficient structural strength must be retained in such portions to facilitate the pressing forces required to form the glass article. It will be appreciated, of course, that reduced wall portions, thicker than ¼ inch, may be utilized and still obtain improved results which will vary with the produce and mold materials involved, however, as the thickness of the wall portions in the moil and yoke areas increase, a loss of the desired thermal efficiency will be experienced.

Although the now preferred embodiments of the invention have been set forth, it will be appreciated by those skilled in the art that various changes and modifications may be made thereto without departing from the spirit or scope thereof as defined in the appended claims.

I claim:

1. Molding apparatus for forming funnel-shaped articles from molten glass having an open upper wide mouth portion and a lower narrow yoke portion while inhibiting the formation of cracks and checks in such yoke area of said articles by minimizing the extraction of heat therefrom during forming to promote the fluidity of the molten glass in such area, said molding apparatus having standard wall portions of conventional thickness extending from about said yoke portion up to said wide mouth portion, said molding apparatus having means adjacent said yoke portion for reducing heat transfer from molten glass supplied to such portion to thereby facilitate glass flow in the area of such yoke portion, said means including relatively thin-wall portions adjacent said yoke portion compared with the thickness of the remaining standard wall portions, and said thin-wall portions being of the same material as that of the remaining wall portions whereby said thin-wall portions extract less heat from the molten glass in contact therewith than the remaining wall portions extract from the molten glass in contact therewith and thereby facilitating the fluidity of the molten glass in the yoke area so as to inhibit the formation of cracks or checks in the yoke portion of the formed funnel-shaped articles.

2. Molding apparatus for forming funnel-shaped articles as defined in claim 1 wherein said thin-wall portions adjacent said yoke portion are less than ½ the thickness of the remaining wall portions between said yoke portion and said wide mouth portion whereby substantially less heat is extracted from the molten glass by said thin-wall portions than by said remaining wall portions so as to maintain greater fluidity of the molten glass adjacent said thin-wall portions.

3. Molding apparatus for forming funnel-shaped articles as defined in claim 1 wherein said apparatus comprises a hollow plunger having upwardly diverging wall portions of a given wall thickness, and a downwardly extending thin-walled portion adjacent the yoke portion of the funnel-shaped article, said thin-walled portion being of the same material as, but having a wall thickness less than ½ the thickness of said diverging wall portions to thereby extract less heat from the molten glass than said diverging wall portions, and to permit subsequent cooling of said thin-walled portion for shrinking it away from the formed article.

4. Molding apparatus for forming funnel-shaped articles as defined in claim 1 wherein said apparatus comprises a mold having upwardly diverging wall portions of a given thickness, and a lower thin-walled central portion of the same material having a wall thickness less than ½ of the thickness of said diverging wall portions, to thereby extract less heat from the molten glass than said diverging wall portions and facilitate the fluidity of the glass for forming the funnel-shaped articles without cracks or checks in the yoke area.

5. Molding apparatus for forming funnel-shaped articles as defined in claim 1 wherein said molding apparatus includes a mold and a plunger each having upwardly diverging wall portions of a defined thickness, said plunger having a thin-walled nose portion of the same material as, and communicating with, the upwardly diverging wall portions of said plunger adjacent the yoke area of the funnel-shaped article, said mold having a thin-walled lower central portion of the same material as, and communicating with, the diverging wall portions of said mold adjacent the yoke area of the funnel-shaped article, and the diverging wall portions of said mold and plunger being within a range of about ¾ of an inch to about 1 ¾ inches and said thin-walled nose portions of the plunger and said thin-walled portion of said mold having a thickness of about ¼ inch, whereby substantially less heat is extracted from the molten glass in contact with said thin-walled portions as is extracted from the molten glass in contact with said diverging wall portions thereby facilitating glass flow and inhibiting the formation of cracks and checks in the yoke area of the funnel-shaped article.

* * * * *